(12) United States Patent
Takeuchi (10) Patent No.: US 10,038,812 B2
(45) Date of Patent: Jul. 31, 2018

(54) IMAGING APPARATUS, RECORDING INSTRUCTION APPARATUS, IMAGE RECORDING METHOD AND RECORDING INSTRUCTION METHOD

(71) Applicant: CASIO COMPUTER CO., LTD., Shibuya-ku, Tokyo (JP)

(72) Inventor: Takeharu Takeuchi, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/226,346

(22) Filed: Aug. 2, 2016

(65) Prior Publication Data

US 2017/0064128 A1   Mar. 2, 2017

(30) Foreign Application Priority Data

Aug. 31, 2015 (JP) .................................. 2015-170018

(51) Int. Cl.
    *H04N 5/225* (2006.01)
    *H04N 1/21* (2006.01)
    *H04N 5/232* (2006.01)

(52) U.S. Cl.
    CPC ......... *H04N 1/2145* (2013.01); *H04N 5/2327* (2013.01); *H04N 5/23222* (2013.01); *H04N 5/23293* (2013.01)

(58) Field of Classification Search
    CPC ............... H04N 1/2145; H04N 5/2327; H04N 5/23293; H04N 5/23222
    USPC ................................ 348/220.1, 221.1, 222.1
    See application file for complete search history.

(56) References Cited

U.S. PATENT DOCUMENTS

| 8,976,270 B2 | 3/2015 | Nonaka et al. | |
| 2009/0310013 A1* | 12/2009 | Odaka | G03B 15/03 348/371 |
| 2011/0115932 A1* | 5/2011 | Shin | H04N 5/232 348/211.4 |

FOREIGN PATENT DOCUMENTS

| JP | 2010193031 A | 9/2010 |
| JP | 2015119432 A | 6/2015 |

OTHER PUBLICATIONS

Japanese Office Action dated Jun. 4, 2018 (and an English translation thereof) issued in counterpart Japanese Application No. 2015-170018.

* cited by examiner

*Primary Examiner* — Yogesh Aggarwal
(74) *Attorney, Agent, or Firm* — Holtz, Holtz & Volek PC (57) ABSTRACT

In a digital camera, burst continuous shooting of continuously capturing a predetermined number of images by an imaging section and retaining and updating them as required is performed. When an instruction to display a live view image is provided, a live view image is generated from frame images acquired by the burst continuous shooting, and transmitted to a remote control device. In the remote control device, when a shutter operation using a touch sensor or a mechanical shutter operation is performed by an operation section, a photographing request is transmitted to the digital camera. In the digital camera, when this request is accepted, whether a live view image has been transmitted is judged. When it has been transmitted, a frame image serving as a source of the live view image at the timing of the shutter operation is extracted, and stored in a recording medium as a processed image.

32 Claims, 7 Drawing Sheets

IMAGING APPARATUS, RECORDING INSTRUCTION APPARATUS, IMAGE RECORDING METHOD AND RECORDING INSTRUCTION METHOD

CROSS-REFERENCE TO RELATED APPLICATION

This application is based upon and claims the benefit of priority from the prior Japanese Patent Application No. 2015-170018, filed Aug. 31, 2015, the entire contents of which are incorporated herein by reference.

BACKGROUND OF THE INVENTION

1. Field of the Invention

The present invention relates to an imaging apparatus, a recording instruction apparatus, an image recording method and a recording instruction method.

2. Description of the Related Art

Conventionally, a technology has been known in which operations (such as photographing parameter setting, photographing operations, and image transfer operations) of a digital camera having a photographing function are controlled by operations on a touchscreen of an information processing terminal (remote device) such as a smartphone, a tablet terminal, or a dedicated terminal.

For example, Japanese Patent Application Laid-Open (Kokai) Publication No. 2010-193031 discloses a digital camera that performs recording by the detection of an operation on a touchscreen and the detection of an operation by a push button, in which an available shutter operation is judged based on whether or not the digital camera is being held stably.

SUMMARY OF THE INVENTION

In accordance with one aspect of the present invention, there is provided an imaging apparatus comprising: an imaging section; an imaging control section which controls the imaging section to perform sequential image capturing; a display section which displays an image captured by the imaging control section; a recording instructing section which provides a recording instruction; a judging section which judges whether or not the recording instruction by the recording instructing section has been provided based on display of the display section; and a control section which performs control such that a captured image corresponding to the image displayed on the display section is recorded when the judging section judges that the recording instruction by the recording instructing section has been provided based on the display of the display section, and an image captured by the imaging section at time of the recording instruction is recorded when the judging section judges that the recording instruction by the recording instructing section has not been provided based on the display of the display section.

In accordance with another aspect of the present invention, there is provided an imaging apparatus comprising: an imaging section; an imaging control section which controls the imaging section to perform sequential image capturing; a generating section which generates an image for sequential display from images captured by the imaging control section; a recording instructing section which provides a recording instruction; a judging section which judges whether or not the recording instruction by the recording instructing section has been provided based on the image for sequential display generated by the generating section; and a control section which performs control such that a captured image corresponding to the image for sequential display is recorded when the judging section judges that the recording instruction by the recording instructing section has been provided based on the image for sequential display generated by the generating section, and an image captured by the imaging section at time of the recording instruction is recorded when the judging section judges that the recording instruction by the recording instructing section has not been provided based on the image for sequential display generated by the generating section.

In accordance with another aspect of the present invention, there is provided a recording instruction apparatus comprising a receiving section which receives images sequentially captured by an imaging apparatus outside the recording instruction apparatus; a display section which displays the images received by the receiving section; a recording instructing section which provides a recording instruction; a judging section which judges whether or not the recording instruction by the recording instructing section has been provided based on display of the display section; and an output section which outputs a control signal for controlling the imaging apparatus to record a captured image corresponding to an image displayed on the display section when the judging section judges that the recording instruction by the recording instructing section has been provided based on the display of the display section, and outputs a control signal for controlling the imaging apparatus to record an image captured at time of the recording instruction when the judging section judges that the recording instruction by the recording instructing section has not been provided based on the display of the display section.

In accordance with another aspect of the present invention, there is provided an image recording method comprising: an imaging control step of controlling an imaging section to perform sequential image capturing; a display control step of displaying sequentially captured images on a display section; a recording instructing step; a judging step of judging whether or not a recording instruction by the recording instructing step has been provided based on display in the display control step; and a control step of performing control such that a captured image corresponding to an image displayed in the display control step is recorded when a judgment is made in the judging step that the recording instruction by the recording instructing step has been provided based on the display in the display control step, and an image captured by the imaging section at time of the recording instruction in the recording instructing step is recorded when a judgment is made in the judging step that the recording instruction by the recording instructing step has not been provided based on the display in the display control step.

In accordance with another aspect of the present invention, there is provided an image recording method comprising: an imaging control step of controlling an imaging section to perform sequential image capturing; a generating step of generating an image for sequential display from images captured in the imaging control step; a recording instructing step; a judging step of judging whether or not a recording instruction by the recording instructing step has been provided based on the image for sequential display generated in the generating step; and a control step of performing control such that a captured image corresponding to the image for sequential display is recorded when a judgment is made in the judging step that the recording instruction by the recording instructing step has been provided based on the image for sequential display generated in the generating step, and an image captured by the imaging section at time of the recording instruction is recorded when a judgment is made in the judging step that the recording instruction by the recording instructing step has not been provided based on the image for sequential display generated in the generating step.

In accordance with another aspect of the present invention, there is provided a recording instruction method comprising: a receiving step of receiving images sequentially captured by an external imaging apparatus; a display control step of displaying the images received in the receiving step on a display section; a recording instructing step; a judging step of judging whether or not a recording instruction by the recording instructing step has been provided based on display in the display control step; and an output step of outputting a control signal for controlling the imaging apparatus to record a captured image corresponding to an image displayed in the display control step when a judgment is made in the judging step that the recording instruction by the recording instructing step has been provided based on the display in the display control step, and outputting a control signal for controlling the imaging apparatus to record an image captured at time of the recording instruction when a judgment is made in the judging step that the recording instruction by the recording instructing step has not been provided based on the display in the display control step.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Embodiments of the present invention will hereinafter be described with reference to the drawings.

A. First Embodiment

Figure 1:
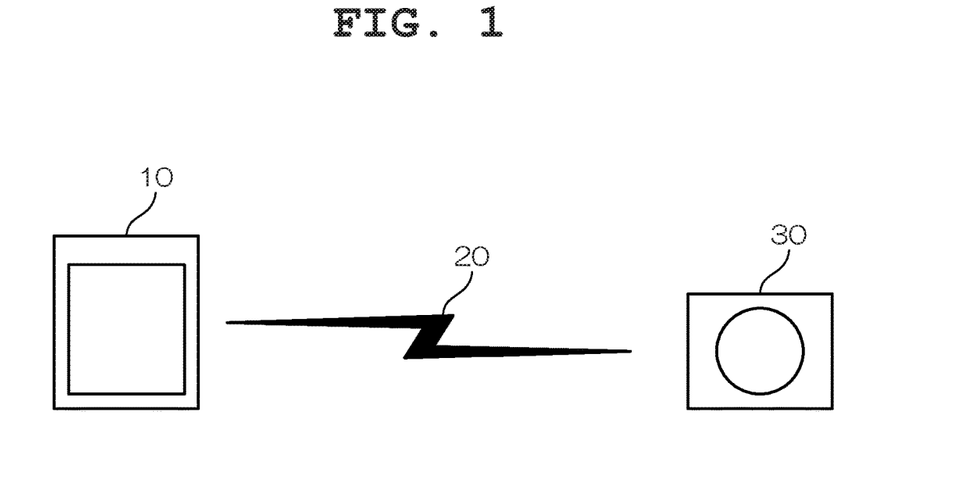
FIG. 1 is a block diagram showing the structure of a photographing system using a remote control device 10 and a digital camera 30 according to a first embodiment of the present invention.

FIG. 1 is a block diagram showing the structure of a photographing system using a remote control device 10 and a digital camera 30 according to a first embodiment of the present invention. The remote control device 10 in FIG. 1 includes a device and a program for performing wireless communication (for example, wireless LAN by Bluetooth (registered trademark), Wi-Fi (registered trademark), or the like) 20 by the digital camera 30. Also, the remote control device 10 includes a touchscreen for giving an instruction to operate the digital camera 30 and a display section for displaying live view images and captured images from the digital camera 30. The digital camera 30 includes a device and a program for performing the wireless communication 20 with the remote control device 10. Also, the digital camera 30 have an imaging function, a function for storing captured images, and a function for transmitting live view images or captured images to the remote control device 10 via the wireless communication 20.

The above-described remote control device 10 and digital camera 30 are detachable, and can be used integrally or separately. However, the remote control device 10 is not limited to a dedicated terminal and, for example, a smartphone, tablet terminal, or the like can be used, although the remote control device in this case is always used in a separate state as a matter of course. In the following descriptions, the case is described in which the remote control device 10 and the digital camera 30 are used in a separate state.

The digital camera 30 performs burst continuous shooting of continuously capturing a predetermined number (for example, five frames) of images during a photographing operation and retaining (buffer) and updating the images as required, generates a live view image based on images (RAW images: images that have not been subjected to compression encoding processing) captured by the burst continuous shooting, and transmits the live view image via the wireless communication 20 to the remote control device 10. The remote control device 10 displays the live view image received from the digital camera 30.

Also, the remote control device 10 includes a shutter constituted by a touch sensor (touchscreen), and a mechanical shutter. The user checks a live view image, and operates the shutter constituted by the touch sensor at desired timing. In a case where an imaging target is known in advance, such as in self photographing by a remote operation, and recording is performed without displaying a live view image, the user operates a mechanical shutter. When the shutter constituted by the touch sensor or the mechanical shutter is operated, the remote control device 10 transmits a photographing request to the digital camera 30.

When a photographing request is received from the remote control device 10, the digital camera 30 judges whether an instruction to transmit a live view image has been provided in advance. Then, when an instruction to transmit a live view image has been provided, the digital camera 30 develops, based on the reception timing (=shutter operation timing) of the photographing request a captured image (RAW image) acquired by the above-described burst continuous shooting and serving as a source of a live view image transmitted at that moment, and stores it as a processed image. When judged that an instruction to transmit a live view image has not been provided, the digital camera 30 develops a captured image (RAW image) acquired by the above-described burst continuous shooting immediately before or immediately after its operation timing, and stores the resultant image as a processed image. On the other hand, the digital camera 30 also has a mechanical shutter by itself. Even when this shutter is depressed by the user, the digital camera 30 develops a captured image (RAW image) acquired by the above-described burst continuous shooting immediately before or immediately after its operation timing, and stores the resultant image as a processed image.

Figure 2A:
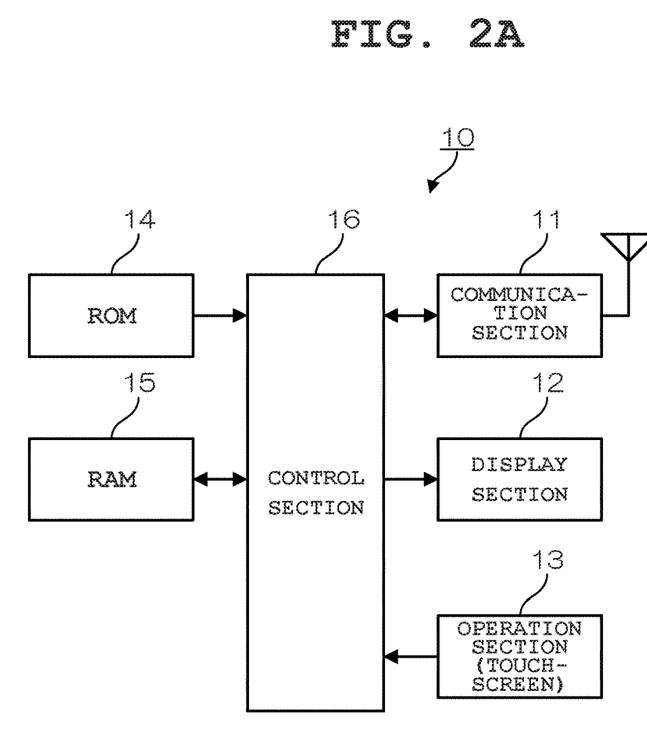
FIG. 2A is a block diagram showing the structure of the remote control device 10 according to the first embodiment.
Figure 2B:
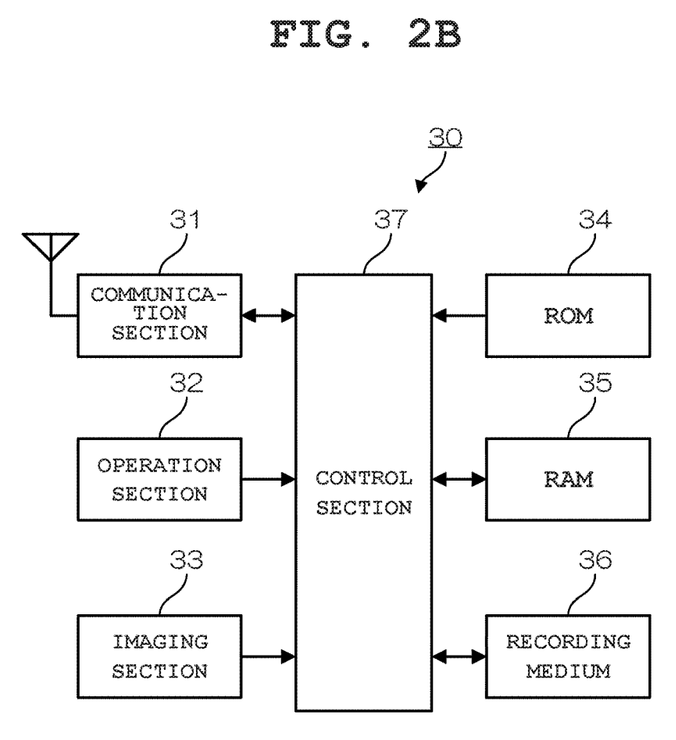
FIG. 2B is a block diagram showing the structure of the digital camera 30 according to the first embodiment.

FIG. 2A is a block diagram showing the structure of the remote control device 10 according to the first embodiment and FIG. 2B is a block diagram showing the structure of the digital camera 30 according to the first embodiment.

The remote control device 10 in FIG. 2A includes a communication section (wireless LAN by Bluetooth (registered trademark), Wi-Fi (registered trademark), or the like) 11, a display section 12, an operation section (touchscreen) 13, a ROM (Read Only Memory) 14, a RAM (Random Access Memory) 15, and a control section 16. The communication section 11 corresponds to the above-described wireless communication 20 and transmits and receives various commands, image files, and the like to and from the remote control device 10 by using, for example, Bluetooth (registered trademark), or Wi-Fi (registered trademark).

The display section 12 is constituted by a liquid crystal display device, an organic EL (Electro Luminescence) display device, or the like, and displays icons linked to specific functions, applications, or the like, application screens, various menu screens, and the like. The operation section (touchscreen) 13 detects a direct contact by or the approach of a finger, stylus (pen), or the like. The operation section (touchscreen) 13 may include a group of mechanical switches such as a power supply button and a sound volume button. In particular, in the first embodiment, a shutter button for giving an instruction to perform a photographing operation by the digital camera 30 is displayed on the operation section (touchscreen) 13 so that a touch operation can be performed thereon.

The ROM 14 has stored therein programs to be executed by the control section 16 and various parameters required for operations and the like. The RAM 15 stores temporary data when the control section 16 executes a program, various application programs, various parameters required for the execution of the applications, image files received from the digital camera 30, and the like.

The control section 16 controls the operation of each section by executing a program stored in the ROM 14 described above. In particular, in the first embodiment, the control section 16 receives a live view image from the digital camera 30, displays it on the display section 12, and transmits a photographing request to the digital camera 30 based on a shutter operation by the operation section (touchscreen) 13 or a mechanical shutter operation.

The digital camera 30 in FIG. 2B includes a communication section 31, an operation section 32, an imaging section 33, a ROM 34, a RAM 35, a recording medium 36, and a control section 37. The communication section 31 corresponds to the above-described wireless communication (for example, wireless LAN by Bluetooth (registered trademark), Wi-Fi (registered trademark), or the like) 20, and transmits and receives various commands, image files and the like to and from the remote control device 10.

The operation section 32 includes a plurality of operation keys such as a power supply switch, shutter switch, zoom switch, mode key, SET key, and cross key to output an operation signal corresponding to the user's key operation. The imaging section 33 includes a lens block constituted by an optical lens group, and an image sensor such as a CCD (Charge Coupled Device) or a CMOS (Complementary Metal Oxide Semiconductor). In the imaging section 33, an image entered from the lens block is converted by the image sensor into a digital signal for output.

The ROM 34 has stored therein programs to be executed by the control section 16 and various parameters required for operations and the like. The RAM 35 is used as a buffer memory for temporarily storing image files captured by the imaging section 33, and is also used as a working memory for the control section 37. The recording medium 36 stores captured image files and the like.

The control section 37 executes a program stored in the ROM 34 to control operation of each section. In particular, in the first embodiment, the control section 37 performs burst continuous shooting of continuously capturing a predetermined number (for example, five frames) of images by the imaging section 33 daring a photographing operation and retaining (buffer) and updating the images as required, generates a live view image based on images (RAW images) captured by the burst continuous shooting, and transmits the live view image to the remote control device 10 via the communication section 31.

Also, upon receiving a photographing request from the remote control device 10, the control section 37 develops, based on the reception timing (=shutter operation timing) of the photographing request, a captured image (RAW image) acquired by the above-described burst continuous shooting and serving as a source of a live view image transmitted at that moment, and stores it in the recording medium 36 as a processed image. Furthermore, when the shutter of the operation section 32 is depressed, the control section 37 develops a captured image (RAW image) acquired by burst continuous shooting immediately before or after that operation timing, and stores it in the recording medium 36 as a processed image.

Note that, although the digital camera 30 of the first embodiment does not include a display section, it may include a display section constituted by a liquid crystal display device, an organic EL (Electro Luminescence) display device, or the like, as in the cases of general digital cameras.

Figure 3:
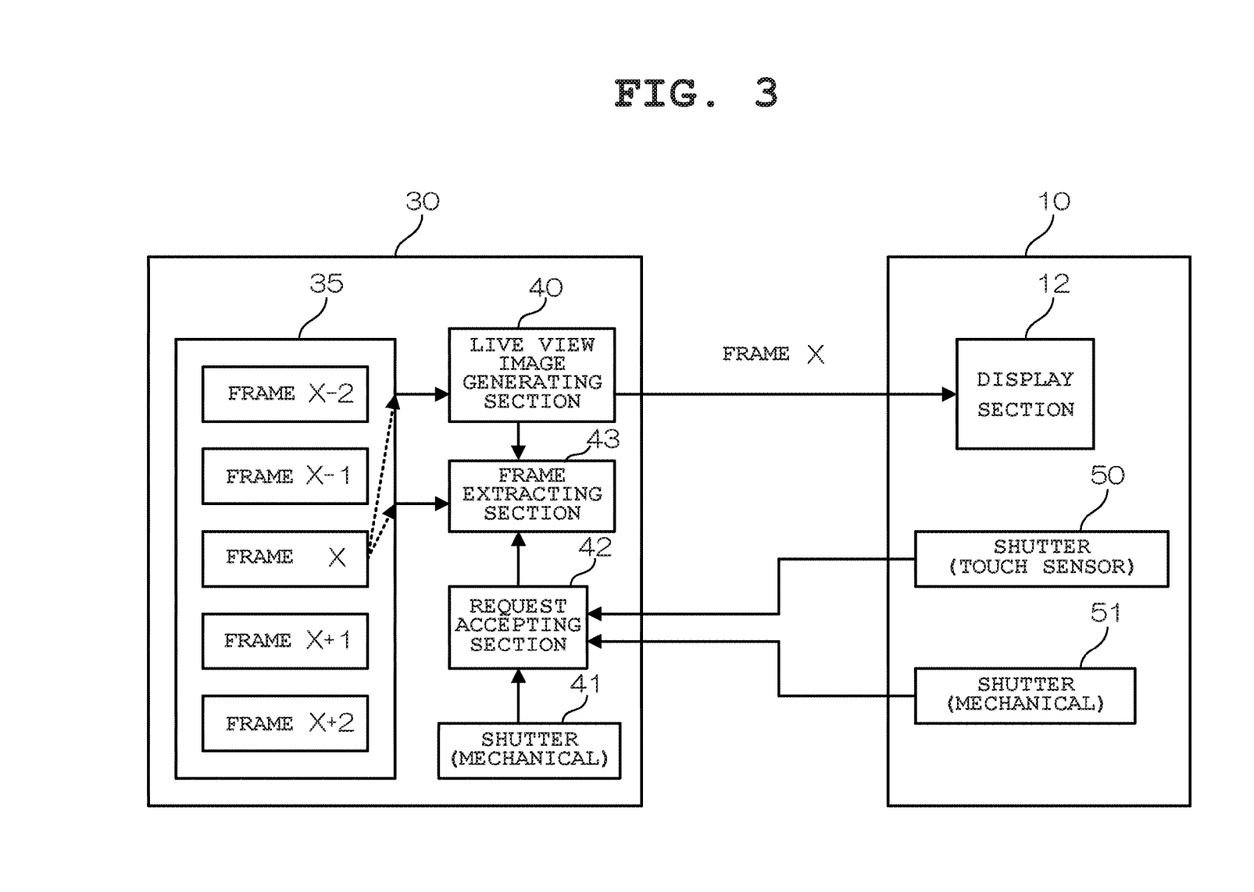
FIG. 3 is a conceptual diagram for describing a live view operation and a photographing operation of the remote control device 10 and the digital camera 30 according to the first embodiment.

FIG. 3 is a conceptual diagram for describing a live view operation and a photographing operation of the remote control device 10 and the digital camera 30 according to the first embodiment. The digital camera 30 performs burst continuous shooting of continuously capturing a predetermined number (for example, five frames) of images by the imaging section 33 during a photographing operation and retaining (buffer) and updating the images as required. In the depicted example, five frame images (RAW images) of frames X−2, X−1, X, X+1, and X+2 are retained (buffered) and updated as required.

A live view image generating section 40 in FIG. 3 performs development processing on a frame image (RAW image) acquired by the above-described burst continuous shooting to generate a live view image at predetermined time intervals, and the live view image is transmitted to the remote control device 10 via the communication section 31. In the depicted example, frame X is transmitted as a live view image. In the remote control device 10, the received live view image is displayed on the display section 12. Also, this remote control device 10 transmits a photographing request to the digital camera 30 based on a shutter (touch sensor or mechanical) operation by the operation section 13.

In the digital camera 30, a request accepting section 42 accepts the photographing request from the remote control device 10. This request accepting section 42 also accepts a photographing request by an operation of a shutter (mechanical) 41 provided on the digital camera 30. When the request accepting section 42 accepts a photographing request from the remote control device 10, if an instruction to display a live view image has been provided in advance, a frame extracting section 43 extracts a frame image (RAM image) serving as a source of a live view image at the timing of the shutter operation (photographing request). In the depicted example, a shutter operation (photographing request) is received at timing when frame X is transmitted as a live view image, and therefore the image (RAW image) of frame X serving as a source of the live view image is extracted.

On the other hand, when the request accepting section 42 accepts a photographing request from the remote control device 10 but an instruction to display a live view image has not been provided in advance or when the request accepting section 42 accepts a photographing request given by the shutter (mechanical) 41 provided on the digital camera 30, the digital camera 30 extracts an image (RAW image) captured by the above-described burst continuous shooting immediately before or after the operation timing. For example, when the display section 12 of the remote control device 10 is disabled, a shutter (touch sensor) 50 is also disabled, and timing immediately before the operation timing of a shutter (mechanical) 51 enabled instead or the operation timing of the shutter (mechanical) 41 provided on the digital camera 30 is the operation timing of frame X+1, the image (RAW image) of frame X+1 is extracted.

Next, the operation of the above-described first embodiment is described.

Figure 4:
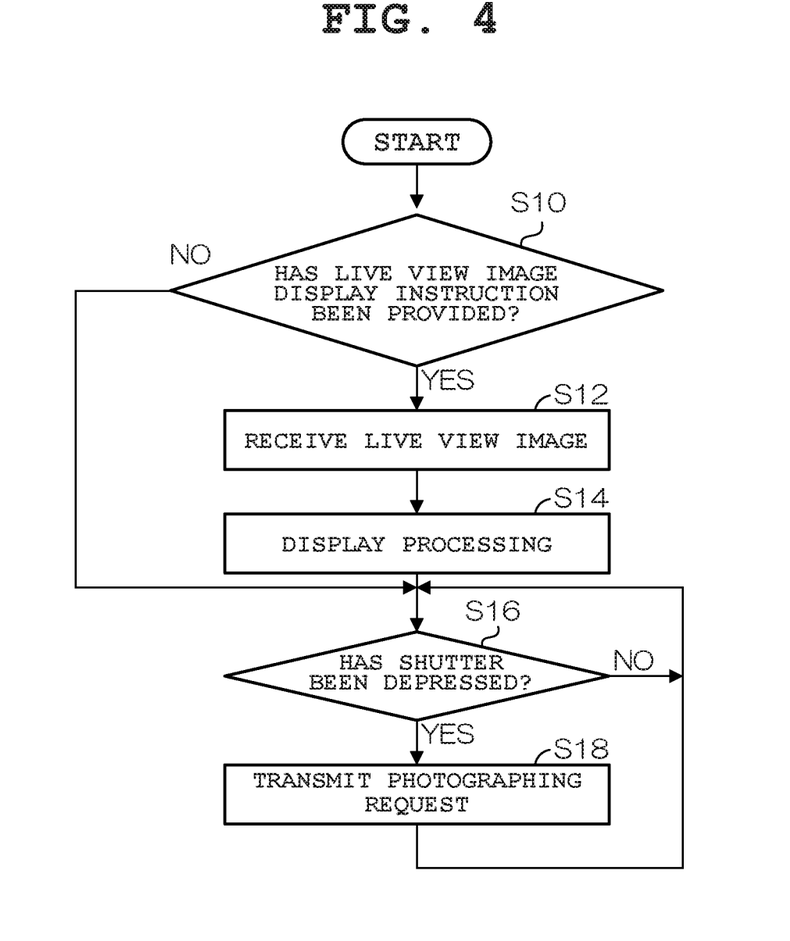
FIG. 4 is a flowchart for describing an operation of the remote control device 10 according to the first embodiment.

FIG. 4 is a flowchart for describing an operation of the remote control device 10 according to the first embodiment. In the remote control device 10, by accepting the user's operation, the control section 16 judges whether an instruction to display a live view image has been provided (Step S10). When judged that a live view image display instruction has not been provided (NO at Step S10), the control section 16 proceeds to Step S16. When judged that a live view image display instruction has been provided (YES at Step S10), the control section 16 receives a live view image from the digital camera 30 via the communication section 11 (Step S12), and causes the live view image to be displayed on the display section 12 (Step S14). Next, the control section 16 repeatedly judges whether a shutter (touch sensor or mechanical) operation by the operation section 13 has been performed on the remote control device 10 (Step S16).

When a shutter (touch sensor or mechanical) operation by the operation section 13 has been performed, the control section 16 transmits a photographing request to the digital camera 30 via the communication section 11 (Step S18). Then, the control section 16 returns to Step S16 and repeats the above-described processing. Note that the control section 16 may receive a captured image from the digital camera 30 after transmitting a photographing request and cause the captured image to be displayed on the display section 12.

Figure 5:
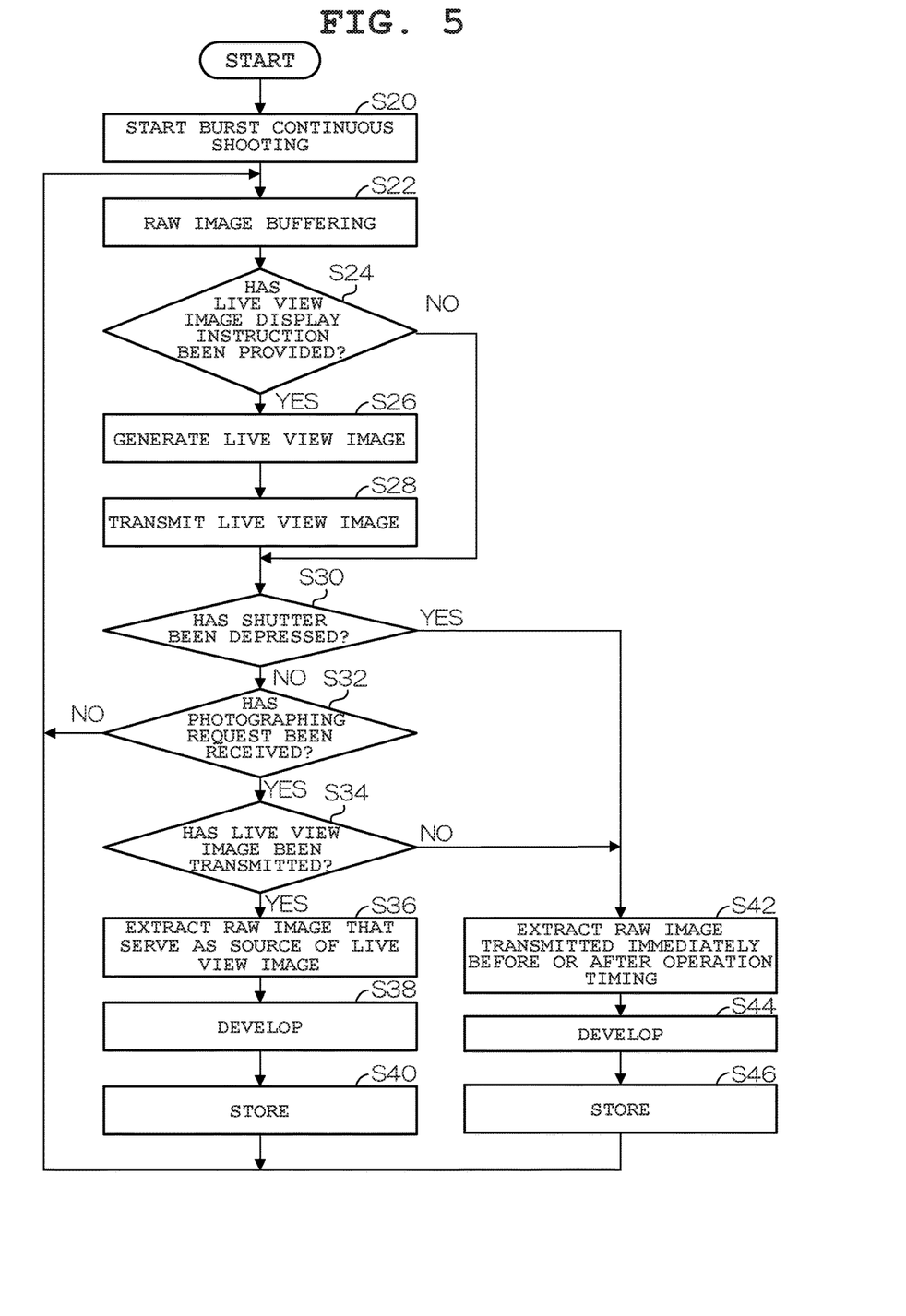
FIG. 5 is a flowchart for describing an operation of the digital camera 30 according to the first embodiment.

FIG. 5 is a flowchart for describing an operation of the digital camera 30 according to the first embodiment. In the digital camera 30, the control section 37 starts burst continuous shooting of continuously capturing a predetermined number of (for example, five) frame images (RAW images) during a photographing operation (Step S20), and retains (buffers) and updates them (RAW images) as required (Step S22). That is, during a photographing operation, the control section 37 continues burst continuous shooting unless any specific operation is performed, and always buffers a predetermined number (for example, five frames) of latest images (RAW images). Next, the control section 37 detects an instruction signal transmitted from the remote control device 10 or judges whether an instruction to display a live view image has been provided based on previous settings of the digital camera 30 (Step S24). When judged that a live view image display instruction has not been provided (NO at Step S24), the control section 37 proceeds to Step S30. When judged that a live view image display instruction has been provided (YES at Step S24), the control section 37 generates a live view image based on frame images (RAW images) acquired by the burst continuous shooting (Step S26), and transmits the live view image to the remote control device 10 via the communication section 31 (Step S28).

Next, the control section 37 judges whether the shutter (mechanical) 41 provided on the digital camera 30 has been depressed (Step S30) When the shutter (mechanical) 41 has not been depressed (NO at Step S30), the control section 37 judges whether a photographing request from the remote control device 10 has been received (Step S32). When a photographing request from the remote control device 10 has been received (YES at Step S32), the control section 37 judges whether any live view image has been transmitted to the remote control device 10 (Step S34). When judged that live view image transmission has been performed (YES at Step S34), the control section 37 extracts a frame image (RAW image) serving as a source of the live view image transmitted at that moment (Step S36), performs development processing on the frame image (RAW image) (Step S38), and stores the resultant image as a processed image (Step S40). Then, the control section 37 returns to Step S22 and repeats the above-described processing. On the other hand, when judged that no live view image has been transmitted (NO at Step S34), the control section 37 performs the same processing as that when the shutter (mechanical) 41 is depressed in the digital camera 30.

As described above, when the shutter of the touch sensor or the mechanical shutter provided on the remote control device 10 is operated by the user checking a live view image on the remote control device 10, a frame image (RAW image) acquired and buffered by burst continuous shooting and serving as a source of the live view image displayed on the remote control device 10 at the timing of operating the shutter of the touch sensor or the mechanical shutter is extracted, developed, and taken as a captured image. Accordingly, the live view image and the actual captured image are prevented from differing. As a result of this configuration, a desired image is captured.

Also, when the mechanical shutter provided on the remote control device 10 is operated with no live view image being checked on the remote control device 10, an image captured by burst continuous shooting at the timing of (immediately before or after) depressing the shutter (mechanical) is taken as a processed image. As a result of this configuration, power consumption for live view image display can be saved, and a desired image can be captured as in the case of a normal remote shutter.

On the other hand, when the shutter (mechanical) 41 provided on the digital camera 30 is depressed (YES at Step S30), the control section 37 extracts a frame image (RAW image) captured by burst continuous shooting immediately before or after this operation timing (Step S42), performs development processing on the frame image (RAW image) (Step S44), and stores the resultant image in the recording medium 36 as a processed image (image that has been subjected to compression encoding processing, such as a "JPEG image") (Step S46). Then, the control section 37 returns to Step S22 and repeats the above-described processing.

As described above, when the shutter (mechanical) 51 of the remote control device 10 or the shutter (mechanical) 41 provided on the digital camera 30 is depressed directly by the user looking at and checking a photographic subject (in this case, the user who has cancelled live view image display is included), an image captured by burst continuous shooting at the timing of (immediately before or after) depressing either one of these shutters is taken as a processed image. As a result of this configuration, as in normal photographing, a desired image can be captured.

According to the above-described first embodiment, a captured image (RAW image) acquired by the above-described burst continuous shooting and serving as a source of a live view image transmitted at the reception timing (=shutter operation timing) of a photographing request is developed and stored as a processed image. As a result of this configuration, a live view image and an image based on shutter timing can be easily captured.

B. Second Embodiment

Next, a second embodiment of the present invention is described.

In the above-described first embodiment, when the shutter (mechanical) 41 provided on the digital camera 30 is directly depressed, an image captured by burst continuous shooting at timing immediately before or after the shutter (mechanical) 41 is depressed is taken as a processed image. By contrast, in the second embodiment, when the shutter (mechanical) 41 is depressed, photographing is performed under a predetermined condition different from that of burst continuous shooting, without using an image captured by burst continuous shooting.

More specifically, for a photographing request transmitted from the remote control device 10, a frame image (RAW image) captured by burst continuous shooting without image stabilization is taken as a processed image, irrespective of the presence or absence of a live view image display instruction. For a photographing request based on the shutter (mechanical) 41 provided on the digital camera 30, an image captured at the timing of depressing the shutter (mechanical) 41 under a photographing condition with image stabilization is taken as a processed image (image that has been subjected to compression encoding processing, such as a "JPEG image").

Figure 6:
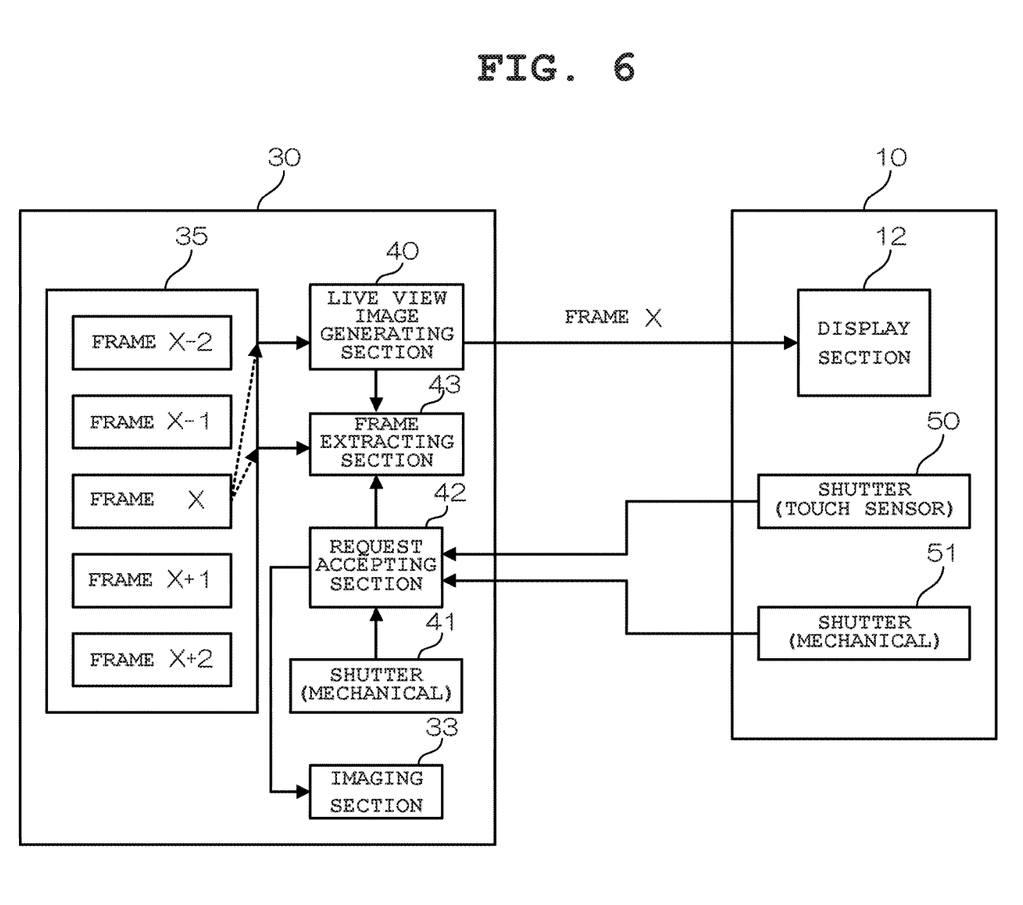
FIG. 6 is a conceptual diagram for describing a live view operation and a photographing operation of a remote control device 10 and a digital camera 30 according to a second embodiment.

FIG. 6 is a conceptual diagram for describing a live view operation and a photographing operation of a remote control device 10 and a digital camera 30 according to the second embodiment. The second embodiment is different from the first embodiment in that when a photographing request by the shutter (mechanical) 41 provided on the digital camera 30 is accepted by the request accepting section 42 in the digital camera 30, photographing is performed by the imaging section 33 at that operation timing under a photographing condition with image stabilization.

That is, when the shutter (mechanical) 41 provided on the digital camera 30 is directly depressed, there is a possibility that image blurring occurs because of the digital camera 30 being held by hand. In this case, by performing image stabilization, a desired captured image can be acquired without image blurring.

Figure 7:
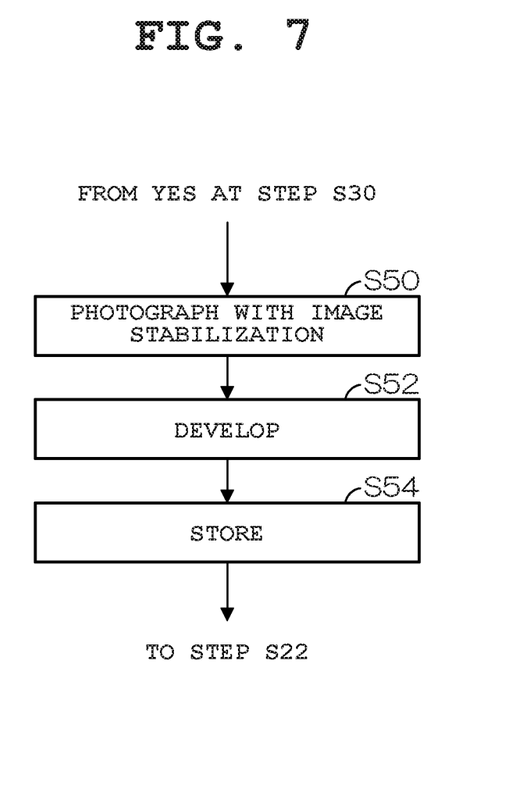
FIG. 7 is a flowchart for describing an operation of the digital camera 30 according to the second embodiment.

FIG. 7 is a flowchart for describing part of the operation of the digital camera 30 according to the second embodiment. Note that Steps S20 to S28 and S32 to S40 depicted in FIG. 5 are similarly applied herein, and therefore only different points will be described. When the shutter (mechanical) 41 provided on the digital camera 30 is depressed (YES at Step S30), the control section 37 performs photographing by the imaging section 33 at this operation timing under a photographing condition with image stabilization (Step S50), performs development processing on the acquired frame image (RAW image) (Step S52), and stores the resultant image in the recording medium 36 as a processed image (Step S54). Then, the control section 37 returns to Step S22 and repeats the above-described processing.

According to the above-described second embodiment, when a photographing request is received from the remote control device 10, an image (RAW image) acquired by the above-described burst continuous shooting and serving as a source of a live view image transmitted at the reception timing (=shutter operation timing) of the photographing request is developed and stored as a processed image. Accordingly, the live view image and the actual captured image are prevented from differing. As a result of this configuration, a desired image can be easily photographed.

Also, according to the above-described second embodiment, when the shutter (mechanical) 41 provided on the digital camera 30 is depressed, photographing is performed by the imaging section 33 at this operation timing under a condition with image stabilization. As a result of this configuration, a desired captured image can be acquired without image blurring.

Note that, although the feature of the above-described second embodiment is the presence or absence of image stabilization, the present invention is not limited thereto, and a configuration may be adopted in which photographing is performed at a low ISO speed for a photographing request by the remote control device 10, and photographing is performed at a high ISO speed, that is, a faster shutter speed for a photographing request by the shutter (mechanical) 41 provided on the digital camera 30. In this configuration as well, by photographing at a high ISO speed, that is, a faster shutter speed, a desired captured image can be acquired with less image deterioration.

Also, a configuration may be adopted in which photographing with movie light is performed for a photographing request by the remote control device 10 and photographing with stroboscopic light emission is performed for a photographing request by the shutter (mechanical) 41 provided on the digital camera 30. More specifically, in the case of photographing in a dark place, photographing is performed with continuous movie light emission. For a photographing request by the remote control device 10, photographing with move light is performed (with push processing). For a photographing request at the digital camera 30, photographing with stroboscopic light emission is performed, in addition to movie light. In this configuration as well, by photographing with stroboscopic light emission, a desired captured image can be acquired with less image deterioration.

Furthermore, for a photographing request by the remote control device 10 with a live view image display instruction, a frame image (RAW image) with the same viewing angle as that of a live view image may be stored as a processed image. For a photographing request by the remote control device 10 without a live view image display instruction or a photographing request by the shutter (mechanical) 41 provided on the digital camera 30, photographing may be performed with a wide angle of a full imaging range. In this case as well, because the possibility of photographing without viewing a live view image is high, a desired captured image can be reliably acquired by photographing with a wide angle of a full imaging range.

In the above-described embodiments, wireless LAN, such as Bluetooth (registered trademark) or Wi-Fi, is used for communication between the remote control device 10 and the digital camera 30. However, other communication means may be used.

Also, in the above-described embodiments, a captured image to be stored is determined based on the presence or absence of a live view image display instruction by the remote control device 10. However, a configuration may be adopted in which a captured image to be stored is determined based on whether or not the user has visually recognized (checked) a live view image and made a recording instruction.

Specifically, an imaging section is provided on the display surface of the display section 12 of the remote control device 10. When this imaging section detects that the user's face or eye direction has been oriented to a direction of visually recognizing (checking) a live view image, and also detects an instruction to record at that moment, it is judged that the user has given a recording instruction while visually recognizing (checking) the live view image.

In addition, when a recording instruction is detected in cases other than the above case, it is judged that the user has given a recording instruction without visually recognizing (checking) a live view image.

A captured image to be stored may be determined based on these judgment results.

While the present invention has been described with reference to the preferred embodiments, it is intended that the invention be not limited by any of the details of the description therein but includes all the embodiments which fall within the scope of the appended claims.

What is claimed is:

1. An imaging apparatus comprising:
   an imaging section;
   a display section; and
   a hardware processor which, under control of a program stored in a memory, executes processes comprising:
   an imaging control process which controls the imaging section to perform sequential image capturing;
   a display control process which controls the display section to display an image captured in the imaging control process;
   a recording instructing process which provides a recording instruction;
   a judging process which judges whether or not provision of the recording instruction in the recording instructing process is based on display of the display section; and
   a control process which performs control such that a captured image corresponding to the image displayed on the display section is recorded when it is judged in the judging process that the provision of the recording instruction in the recording instructing process is based on the display of the display section, and such that an image captured by the imaging section at a time of the recording instruction is recorded when it is judged in the judging process that the provision of the recording instruction in the recording instructing section is not based on the display of the display section.

2. The imaging apparatus according to claim 1, wherein the control process changes a condition for image capturing by the imaging section based on a judgment result of the judging process.

3. The imaging apparatus according to claim 2, wherein the control process controls, as the condition for image capturing by the imaging section, execution of image stabilization processing on the captured image based on the judgment result of the judging process.

4. The imaging apparatus according to claim 2, wherein the control process changes, as the condition for image capturing by the imaging section, a light emission condition for image capturing by the imaging section based on the judgment result of the judging process.

5. The imaging apparatus according to claim 2, wherein the control process changes, as the condition for image capturing by the imaging section, a viewing angle for image capturing by the imaging section based on the judgment result of the judging process.

6. The imaging apparatus according to claim 2, wherein the control process changes, as the condition for image capturing by the imaging section, a zoom ratio for image capturing by the imaging section based on the judgment result of the judging process.

7. The imaging apparatus according to claim 1, wherein the imaging section and the display section are respectively provided in a first housing and a second housing having separate bodies.

8. The imaging apparatus according to claim 7, wherein the first housing and the second housing are mutually connected via wireless communication, and
   wherein images captured by the imaging section under control of the imaging control process are sequentially transmitted from the first housing having the imaging section to the second housing having the display section via the wireless communication.

9. The imaging apparatus according to claim 1, wherein the judging process, when the recording instruction has been provided in the recording instructing process in a state where the display of the image in the display control process is being performed, judges that the provision of the recording instruction in the recording instructing process is based on the display of the display section, and, when the recording instruction has been provided in the recording instructing process in a state where the display of the image in the display control process is not being performed, judges that the provision of the recording instruction in the recording instructing section is not based on the display of the display section.

10. The imaging apparatus according to claim 7, wherein the first housing is provided with a first shutter which is operable by a user,
    wherein the display section of the second housing is provided with a second shutter which is operable by the user,
    wherein the recording instructing process provides a first recording instruction as the recording instruction when the first shutter has been operated by the user, and provides a second recording instruction as the recording instruction when the second shutter has been operated by the user, and
    wherein the judging process:
    when the first recording instruction has been provided, judges that the provision of the recording instruction in the recording instructing process is not based on the display of the display section, when the second recording instruction has been provided in a state where the first recording instruction has not been provided and the display of the image in the display control process is not being performed, judges that the provision of the recording instruction in the recording instructing process is not based on the display of the display section, and when the second recording instruction has been provided in a state where the first recording instruction has not been provided and the display of the image in the display control process is being performed, judges that the provision of the recording instruction in the recording instructing section is based on the display of the display section.

11. The imaging apparatus according to claim 1, wherein the judging process, when the recording instruction has been provided in the recording instructing process in a state where a face direction or an eye direction of a user is oriented in a direction of visually recognizing the display section, judges that the provision of the recording instruction is based on the display of the display section, and, when the recording instruction has been provided in the recording instructing process in a state where the face direction or the eye direction of the user is not oriented in the direction of visually recognizing the display section, judges that the provision of the recording instruction is not based on the display of the display section.

12. An imaging apparatus comprising:
an imaging section; and
a hardware processor which, under control of a program stored in a memory, executes processes comprising:
an imaging control process which controls the imaging section to perform sequential image capturing;
an image generating process which generates an image for sequential display from images captured by the imaging control section;
a recording instructing process which provides a recording instruction;
a judging process which judges whether or not provision of the recording instruction in the recording instructing process is based on the image for sequential display generated in the image generating process; and
a control process which performs control such that a captured image corresponding to the image for sequential display is recorded when it is judged in the judging process that the provision of the recording instruction in the recording instructing process is based on the image for sequential display generated in the image generating process, and such that an image captured by the imaging section at a time of the recording instruction is recorded when it is judged in the judging process that the provision of the recording instruction in the recording instructing process is not based on the image for sequential display generated in the image generating process.

13. The imaging apparatus according to claim 12, wherein the hardware processor, under control the program stored in the memory, executes further processes comprising:
an output process which outputs the image for sequential display to a display device outside the imaging apparatus, and
a control signal detecting process which detects a control signal transmitted from the display device.

14. The imaging apparatus according to claim 12, wherein the judging process, when the recording instruction has been provided in the recording instructing process in a state where the image for sequential display is being generated in the image generating process, judges that the provision of the recording instruction in the recording instructing process is based on the image for sequential display, and, when the recording instruction has been provided in the recording instructing process in a state where the image for sequential display is not being generated in the image generating process, judges that the provision of the recording instruction in the recording instructing process is not based on the image for sequential display.

15. The imaging apparatus according to claim 13, wherein the imaging apparatus is provided with a first shutter which is operable by a user,
wherein the display device is provided with a second shutter which is operable by the user, and the display device transmits the control signal to the imaging apparatus when the second shutter has been operated by the user,
wherein the recording instructing process provides a first recording instruction as the recording instruction when the first shutter has been operated by the user, and provides a second recording instruction as the recording instruction when the second shutter has been operated by the user, and
wherein the judging process:
when the first recording instruction has been provided, judges that the provision of the recording instruction in the recording instructing process is not based on the image for sequential display,
when the second recording instruction has been provided in a state where the first recording instruction has not been provided and the image for sequential display is not being generated in the image generating process, judges that the provision of the recording instruction in the recording instructing process is not based on the image for sequential display, and
when the second recording instruction has been provided in a state where the first recording instruction has not been provided and the image for sequential display is being generated in the image generating process, judges that the provision of the recording instruction in the recording instructing process is based on the image for sequential display.

16. The imaging apparatus according to claim 13, wherein the judging process, when the recording instruction has been provided in the recording instructing process in a state where a face direction or an eye direction of a user is oriented in a direction of visually recognizing the display device, judges that the provision of the recording instruction is based on the image for sequential display, and, when the recording instruction has been provided in the recording instructing process in a state where the face direction or the eye direction of the user is not oriented in the direction of visually recognizing the display device, judges that the provision of the recording instruction is not based on the image for sequential display.

17. A recording instruction apparatus comprising:
a communication section;
a display section; and
a hardware processor which, under control of a program stored in a memory, executes processes comprising:

a receiving process which receives, via the communication section, images sequentially captured by an imaging apparatus outside the recording instruction apparatus;

a display control process which controls the display section to display the images received in the receiving process;

a recording instructing process which provides a recording instruction;

a judging process which judges whether or not provision of the recording instruction in the recording instructing process is based on display of the display section; and an output process which outputs a control signal for controlling the imaging apparatus to record a captured image corresponding to an image displayed on the display section when it is judged in the judging process that the provision of the recording instruction in the recording instructing process is based on the display of the display section, and which outputs a control signal for controlling the imaging apparatus to record an image captured at a time of the recording instruction when it is judged in the judging process that the provision of the recording instruction in the recording instructing process is not based on the display of the display section.

18. The recording instruction apparatus according to claim 17, wherein the judging process, when the recording instruction has been provided in the recording instructing process in a state where the display control process is being performed, judges that the provision of the recording instruction in the recording instructing process is based on the display of the display section, and, when the recording instruction has been provided in the recording instructing process in a state where the display control process is not being performed, judges that the provision of the recording instruction in the recording instructing process is not based on the display of the display section.

19. The recording instruction apparatus according to claim 17, wherein the imaging apparatus is provided with a first shutter which is operable by a user, wherein the recording instruction apparatus is provided with a second shutter which is operable by the user, wherein the recording instructing process provides a first recording instruction as the recording instruction when the first shutter has been operated by the user, and provides a second recording instruction as the recording instruction when the second shutter has been operated by the user, and wherein the judging process:

when the first recording instruction has been provided, judges that the provision of the recording instruction in the recording instructing process is not based on the display of the display section, when the second recording instruction has been provided in a state where the first recording instruction has not been provided and the display control process is not being performed, judges that the provision of the recording instruction in the recording instructing process is not based on the display of the display section, and when the second recording instruction has been provided in a state where the first recording instruction has not been provided and the display control process is being performed, judges that the provision of the recording instruction in the recording instructing process is based on the display of the display section.

20. The recording instruction apparatus according to claim 17, wherein the judging process, when the recording instruction has been provided in the recording instructing process in a state where a face direction or an eye direction of a user is oriented in a direction of visually recognizing the display section, judges that the provision of the recording instruction is based on the display of the display section, and, when the recording instruction has been provided in the recording instructing process in a state where the face direction or the eye direction of the user is not oriented in the direction of visually recognizing the display section, judges that the provision of the recording instruction is not based on the display of the display section.

21. An image recording method comprising:

controlling an imaging section to perform sequential image capturing;

displaying sequentially captured images on a display section;

providing a recording instruction;

judging whether or not provision of the recording instruction is based on display performed in the displaying; and performing control such that a captured image corresponding to an image displayed in the displaying is recorded when it is judged that the provision of the recording instruction is based on the display performed in the displaying, and such that an image captured by the imaging section at a time of the recording instruction is recorded when it is judged that the provision of the recording instruction is not based on the display performed in the displaying.

22. The image recording method according to claim 21, wherein the judging, when the recording instruction has been provided in a state where the display performed in the displaying is being performed, judges that the provision of the recording instruction is based on the display performed in the displaying, and, when the recording instruction has been provided in a state where the display performed in the displaying is not being performed, judges that the provision of the recording instruction is not based on the display performed in the displaying.

23. The image recording method according to claim 21, wherein the imaging section and the display section are respectively provided in a first housing and a second housing having separate bodies, wherein the first housing is provided with a first shutter which is operable by a user, wherein the display section of the second housing is provided with a second shutter which is operable by the user, wherein the providing the recording instructing provides a first recording instruction as the recording instruction when the first shutter has been operated by the user, and provides a second recording instruction as the recording instruction when the second shutter has been operated by the user, and wherein the judging:

when the first recording instruction has been provided, judges that the provision of the recording instruction is not based on the display performed in the displaying, when the second recording instruction has been provided in a state where the first recording instruction has not been provided and the display performed in the displaying is not being performed, judges that the provision of the recording instruction is not based on the display performed in the displaying, and when the second recording instruction has been provided in a state where the first recording instruction has not been provided and the display performed in the displaying is being performed, judges that the provision of the recording instruction is based on the display performed in the displaying.

24. The image recording method according to claim 21, wherein the judging, when the recording instruction has been provided in a state where a face direction or an eye direction of a user is oriented in a direction of visually recognizing the display section, judges that the provision of the recording instruction is based on the display performed in the displaying, and, when the recording instruction has been provided in a state where the face direction or the eye direction of the user is not oriented in the direction of visually recognizing the display section, judges that the provision of the recording instruction is not based on the display performed in the displaying.

25. An image recording method comprising:
controlling an imaging section to perform sequential image capturing;
generating an image for sequential display from images captured in the controlling;
providing a recording instruction;
judging whether or not provision of the recording instruction is based on the generated image for sequential display; and
performing control such that a captured image corresponding to the generated image for sequential display is recorded when it is judged that the provision of the recording instruction is based on the generated image for sequential display, and such that an image captured by the imaging section at a time of the recording instruction is recorded when it is judged that the provision of the recording instruction is not based on the generated image for sequential display.

26. The image recording method according to claim 25, wherein the judging, when the recording instruction has been provided in a state where the image for sequential display is being generated in the generating, judges that the provision of the recording instruction is based on the generated image for sequential display, and, when the recording instruction has been provided in a state where the image for sequential display is not being generated in the generating, judges that the provision of the recording instruction is not based on the generated image for sequential display.

27. The image recording method according to claim 25, wherein the imaging section is provided with a first shutter which is operable by a user,
wherein the image recording method further comprises outputting the generated image for sequential display to a display device outside the imaging section,
wherein the display device is provided with a second shutter which is operable by the user,
wherein the providing the recording instruction provides a first recording instruction as the recording instruction when the first shutter has been operated by the user, and provides a second recording instruction as the recording instruction when the second shutter has been operated by the user, and
wherein the judging:
when the first recording instruction has been provided, judges that the provision of the recording instruction is not based on the generated image for sequential display,
when the second recording instruction has been provided in a state where the first recording instruction has not been provided and the image for sequential display is not being generated in the generating, judges that the provision of the recording instruction is not based on the generated image for sequential display, and
when the second recording instruction has been provided in a state where the first recording instruction has not been provided and the image for sequential display is being generated in the generating, judges that the provision of the recording instruction is based on the generated image for sequential display.

28. The image recording method according to claim 25, further comprising outputting the generated image for sequential display to a display device,
wherein the judging, when the recording instruction has been provided in a state where a face direction or an eye direction of a user is oriented in a direction of visually recognizing the display device, judges that the provision of the recording instruction is based on the generated image for sequential display, and, when the recording instruction has been provided in a state where the face direction or the eye direction of the user is not oriented in the direction of visually recognizing the display device, judges that the provision of the recording instruction is not based on the generated image for sequential display.

29. A recording instruction method that is performed by a recording instruction apparatus, the method comprising:
receiving images sequentially captured by an imaging apparatus outside the recording instruction apparatus;
displaying the received images on a display section;
providing a recording instruction;
judging whether or not provision of the recording instruction is based on display performed in the displaying; and
outputting a control signal for controlling the imaging apparatus to record a captured image corresponding to an image displayed in the displaying when it is judged that the provision of the recording instruction is based on the display performed in the displaying, and outputting a control signal for controlling the imaging apparatus to record an image captured at a time of the recording instruction when it is judged that the provision of the recording instruction is not based on the display performed in the displaying.

30. The recording instruction method according to claim 29, wherein the judging, when the recording instruction has been provided in a state where the display performed in the displaying is being performed, judges that the provision of the recording instruction is based on the display performed in the displaying, and, when the recording instruction has been provided in a state where the display performed in the displaying is not being performed, judges that the provision of the recording instruction is not based on the display performed in the displaying.

31. The recording instruction method according to claim 29, wherein the imaging apparatus is provided with a first shutter which is operable by a user,
wherein the recording instruction apparatus is provided with a second shutter which is operable by the user,
wherein the providing the recording instruction provides a first recording instruction as the recording instruction when the first shutter has been operated by the user, and provides a second recording instruction as the recording instruction when the second shutter has been operated by the user, and wherein the judging:
- when the first recording instruction has been provided, judges that the provision of the recording instruction is not based on the display performed in the displaying,
- when the second recording instruction has been provided in a state where the first recording instruction has not been provided and the display performed in the displaying is not being performed, judges that the provision of the recording instruction is not based on the display performed in the displaying, and
- when the second recording instruction has been provided in a state where the first recording instruction has not been provided and the display performed in the displaying is being performed, judges that the provision of the recording instruction is based on the display performed in the displaying.

32. The image recording method according to claim 29, wherein the judging, when the recording instruction has been provided in a state where a face direction or an eye direction of a user is oriented in a direction of visually recognizing the display section, judges that the provision of the recording instruction is based on the display performed in the displaying, and, when the recording instruction has been provided in a state where the face direction or the eye direction of the user is not oriented in the direction of visually recognizing the display section, judges that the provision of the recording instruction is not based on the display performed in the displaying.

* * * * *